(No Model.)
J. W. PATERSON.
BRAKE HANDLE.
No. 531,596. Patented Dec. 25, 1894.
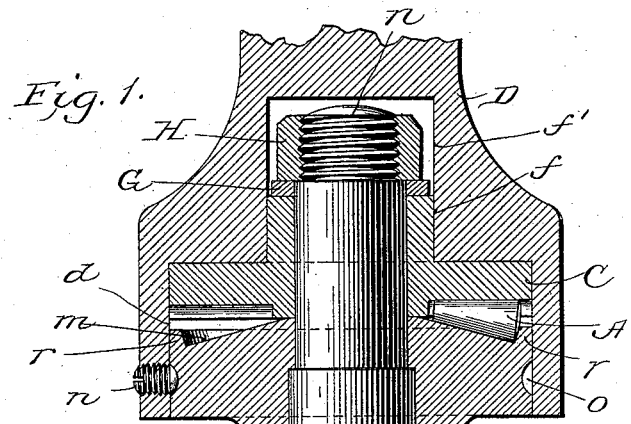
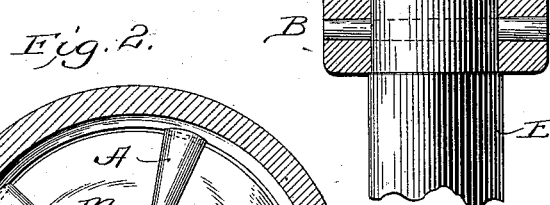
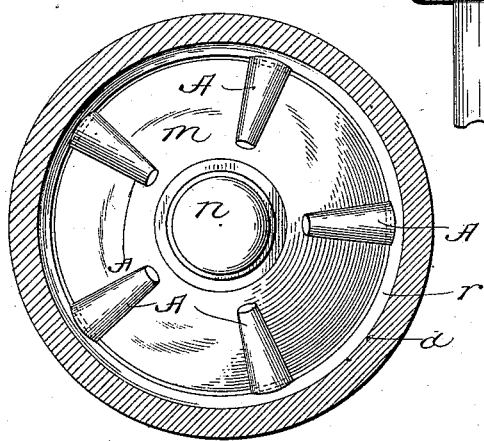
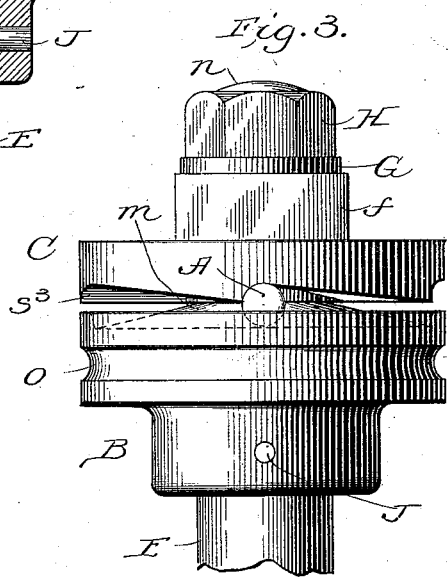
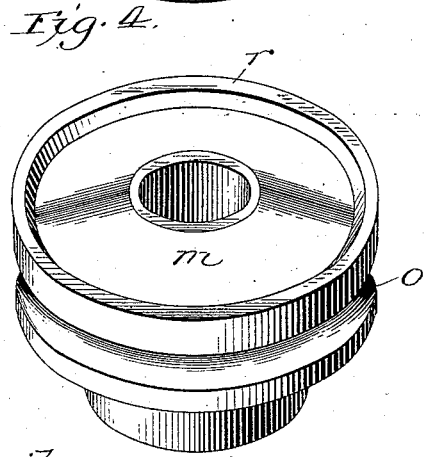
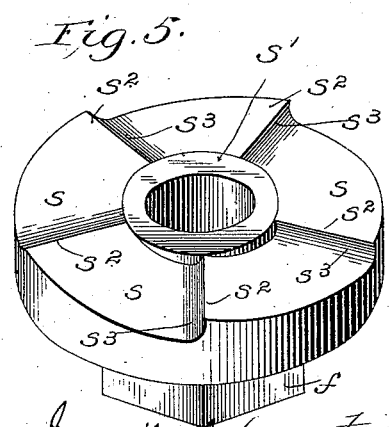
Witnesses:
Harry S. Rohrer
O. R. Latham
Inventor
James W. Paterson
By H. W. T. Ward, Attys.

UNITED STATES PATENT OFFICE.

JAMES W. PATERSON, OF CHICAGO, ILLINOIS, ASSIGNOR TO THE ADAMS & WESTLAKE COMPANY, OF ILLINOIS.

BRAKE-HANDLE.

SPECIFICATION forming part of Letters Patent No. 531,596, dated December 25, 1894.

Application filed July 25, 1894. Serial No. 518,566. (No model.)

*To all whom it may concern:*

Be it known that I, JAMES W. PATERSON, of the city of Chicago, in the county of Cook and State of Illinois, have invented certain new and useful Improvements in Brake-Handles, of which the following is a specification, reference being had to the accompanying drawings, and to the letters of reference marked thereon.

This invention relates to that class of brake-handles for use on street and other cars, which when moved or given rotation in one direction by the driver or brakeman, grip upon the brake staff, or parts attached rigidly thereto, thereby carrying the brake staff with it in rotation and causing the brakes to be set, but, when the direction of rotary movement is reversed, the handle shall rotate upon the brake staff without moving the latter, and the invention consists in combining with the brake handle and brake staff a frictional roll clutch, as hereinafter set forth.

In the accompanying drawings, Figure 1 is a view, chiefly in vertical section, of my invention as applied to the upper end of a brake staff. Fig. 2 is a plan showing the lower or socket portion of the handle in section, and the lower parts of the frictional clutch or gripping device and the brake staff in full lines, the upper parts of the frictional clutch or gripping device being removed. Fig. 3 is an exterior view, or side elevation, of the gripping device applied to the brake staff, the handle being removed. Figs. 4, 5 and 6 are perspective views of detached parts of the invention as hereinafter described.

Similar letters of reference indicate similar parts in the respective figures.

E represents the brake staff or rod upon which the brake chain is usually wound.

B is a hub shown detached in Fig. 4, which when in place is rigidly attached to, or forms a part of, the staff E. The hub B has an inclined face $m$ and an outer annular shoulder $r$, the inner surface of which is inclined somewhat from the vertical line, as shown.

As seen in Fig. 1, the hub B is rigidly united to the brake staff E by means of a pin J, but any other convenient mode of union may be adopted. The hub is provided with a circumferential groove $o$ for a purpose hereinafter described.

C is a plate shown detached in Fig. 5, and having inclined faces $s$, and adapted to rotate freely upon the reduced upper portion of the brake staff E. The inclined faces $s$ are of a width equal to the distance between the circumference of the plate C and that of the collar $s'$, and each inclined face, at its highest point, terminates in a radial shoulder $s^2$, flush with the surface of the collar $s'$, the shoulder $s^2$ uniting with the highest part of said inclined face by a curved radial surface $s^3$.

A, A represent conical rolls, one of which is seen detached in Fig. 6, a series of which rolls is arranged radially with respect to the center of the brake staff, as shown in Fig. 2. A roll is provided for each of the inclined faces $s$ of the plate C, and each roll is confined between the upper inclined face $m$ of the hub B, and one of the inclined faces $s$ of the plate C, the roll, when in its inoperative position being adapted to fit against the curved radial surface $s^3$ of its shoulder $s^2$.

The upper reduced portion of the brake staff E extends through the plate C, and its square collar $f$, which fits in a square socket $f'$, of the brake handle D.

The hub B, plate C, and rolls A, when clamped together through the medium of the nut H upon the threaded portion $n$ of the brake staff E, and the washer G, constitute the gripping device proper.

A socket or enlarged hollow boss $d$ is formed at the bottom of the brake handle, and the said socket, as will be seen, entirely incloses the gripping device. The lower interior portion of the socket $d$ is circular in form so as to rotate upon or around the hub B and plate C, while by reason of the fitting of the square hub $f$ of the plate C, in the square socket $f'$ of the brake handle, the plate C will be carried in rotation with the handle socket D, as hereinafter explained.

The handle D is prevented from separation from the hub B by means of a threaded pin $p$ which passes through the side of the socket $d$ and enters an annular groove $o$ formed in said hub.

In operation, the brake handle D being turned in one direction, say to the right, the inclined faces s of the plate C, bearing upon the rolls A, cause the said rolls to rotate up and upon the inclined face m of the hub B, and down the inclined faces s of the plate C the respective opposing faces forming a series of gradually contracting seats, the rolls A being caused to ride or advance toward the narrow ends of said seats. As the hub B and plate C cannot move apart because of their connection through the medium of the brake staff E and nut H, the rolls A jam between the hub B and plate C, and carry the hub and the brake staff connected thereto in rotation with the brake handle. When, however, the direction of rotation of the handle is reversed, the rolls A at once start toward the wider ends of the seats in which they play, being stopped by the radial curved surfaces $s^3$, releasing the hub B, and consequently the brake staff E for another bite of the gripping mechanism. The function of the annular shoulder r is to take the end thrust of the rolls A. It will be seen that the brake chain may be wound upon the staff by successive forward and backward movements of the handle D without giving it a complete revolution.

There is comparatively little lost motion in the gripping device, the movement of the rolls, due to the operations required of them, being slight. All the operative parts may, if desired, be of steel, in order to insure strength and durability. The entire device is simple in construction, strong, and comparatively inexpensive.

I do not restrict myself to the number of rolls radially arranged, nor, consequently, to the number of inclined faces s to be formed upon the plate C, forming, with the inclined face m of the hub B, a series of openings, ways or seats in which the said rolls play. The distance of travel to insure the necessary grip or bite, is, as will be understood, dependent upon the number of rolls and inclines, which may be varied to suit requirements. Instead of making the pin upon which the plate C revolves a reduced portion of the brake staff, it may be solid with the hub B; and other immaterial changes from the preferred construction herein shown may be made without departing from the main features of my invention. Neither is it essential that a collar s' be formed to engage the inner ends of the rolls, or that the outer annular shoulder r have the inclined inner face, as shown, as these, and other minor details of formation, may be changed without departing from the essentials of my invention. Neither do I limit myself to the mode of attaching or tying the parts together, that here shown being, however, the one preferred; but, Having described my invention, I claim—

1. In combination with a brake handle and a brake staff, a frictional clutch, one member of which is secured to the brake staff and provided with an inclined surface, and the other member of which is secured to the brake handle and furnished with a series of inclined faces, and a series of conical or tapered rolls, confined radially between the two members of the frictional clutch, substantially as set forth.

2. The combination of a brake handle and a brake staff a frictional clutch, one member of which is secured to the brake staff and provided with an inclined upper surface, and the other member of which is secured to the brake handle and provided with a series of inclined lower surfaces, and a series of conical or tapered rolls confined radially between said two members of the clutch, substantially as set forth.

3. The combination of a brake staff, two members of a clutch provided with frictional surfaces and a series of conical rolls confined radially between said frictional surfaces of the two members of the clutch, substantially as set forth.

4. The combination of a brake staff, two members of a clutch provided with frictional surfaces, a series of radially arranged conical rolls confined between said surfaces, and a brake handle having a socket inclosing the two members of the clutch, and the rolls, substantially as set forth.

5. The combination of a brake handle having a lower socket, a frictional clutch, the lower member of which is secured to the brake staff and provided with an operative surface to engage friction rolls, the other member of which is secured to the brake handle, and also provided with operative surfaces to engage the friction rolls, and a series of radial conical friction rolls, the whole frictional roll clutch or gripping device being confined within the socket of the handle, substantially as set forth.

6. The combination of a brake handle, a frictional clutch, one member of which is secured to the brake handle and provided with inclines on its lower surface, and the other member of which is secured to the brake staff and provided with an inclined upper surface, and a series of friction rolls radially arranged between the opposing surfaces of the respective members of the clutch, and means whereby the two members of the friction clutch may be drawn or tied together to clamp said friction rolls between them, substantially as set forth.

7. In combination with a brake handle, a hub secured thereto and having an upper inclined surface, a plate provided with a series of inclines and adapted to revolve upon the brake staff, and a series of radial conical rolls confined between said upper inclined surface of the hub and the inclines of the plate, said brake handle having a socket inclosing said members of the frictional clutch, and adapted to move coincidently with the said plate, substantially as set forth.

8. In a frictional roll clutch for a brake handle, the combination of a brake staff, a hub mounted thereon having an inclined upper surface and an outer rim, a series of conical friction rolls resting on said upper surface, the end thrust of which rolls is received by said outer rim, an upper plate having a series of inclined faces at its under side and adapted to rotate with the handle upon the brake staff, said upper plate resting upon the series of conical rolls, and means for clamping the hub and plate and the conical rolls between the surfaces thereof, substantially as set forth.

9. The combination of a brake handle having a lower socket, a plate held within the socket, a brake staff, a hub, mounted on the said staff, having a circumferential groove, a series of friction rolls confined between the faces of the said plate and hub, respectively, and a screw or pin projecting through the socket into said groove, whereby the socket may turn upon the said hub and yet be prevented from detachment therefrom, substantially as set forth.

In testimony whereof I hereto set my hand and affix my seal.

JAMES W. PATERSON. [L. S.]

Witnesses:
WM. S. HAMM,
WM. S. ESTELL.